United States Patent Office 3,490,676
Patented Jan. 20, 1970

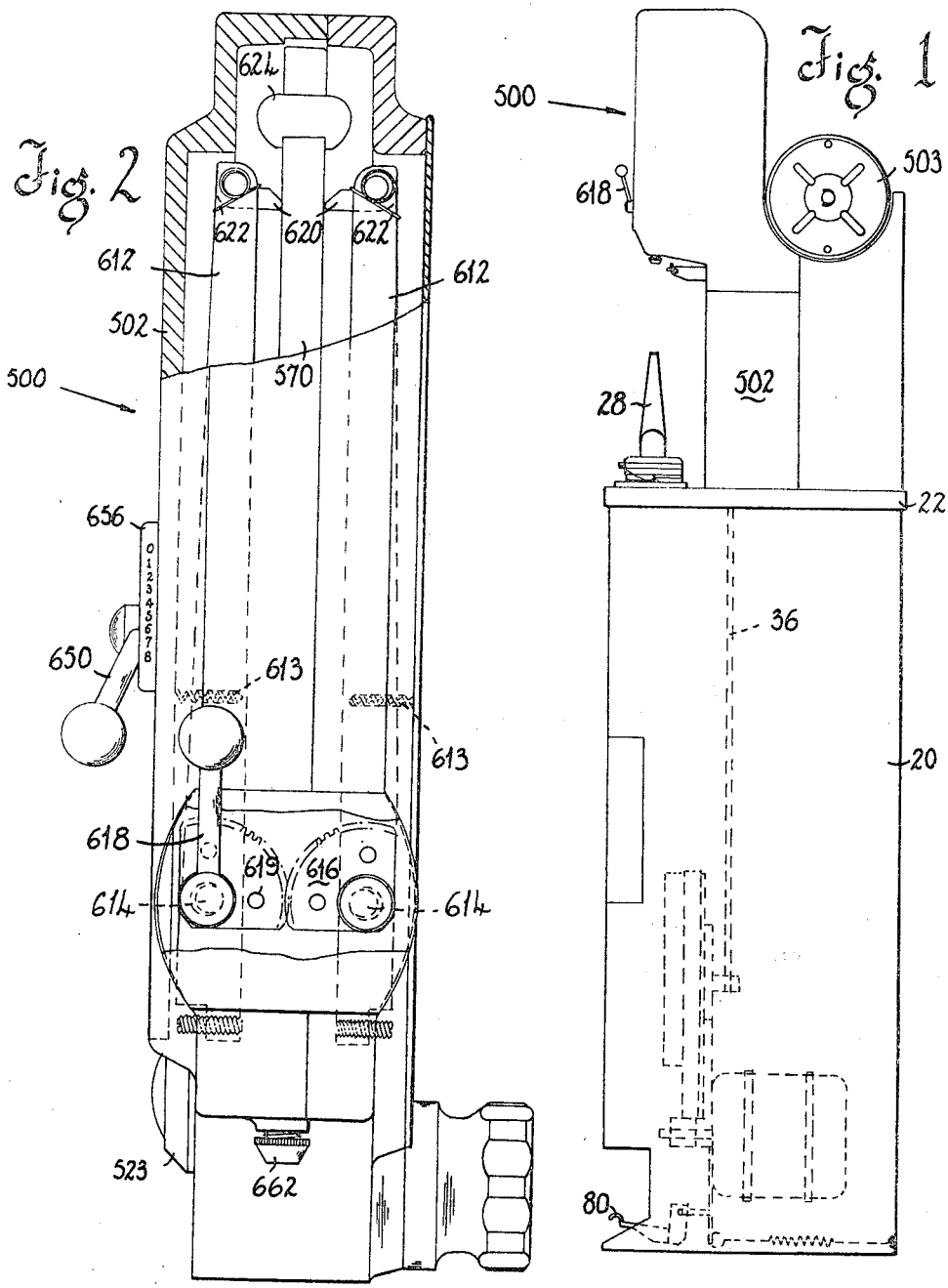

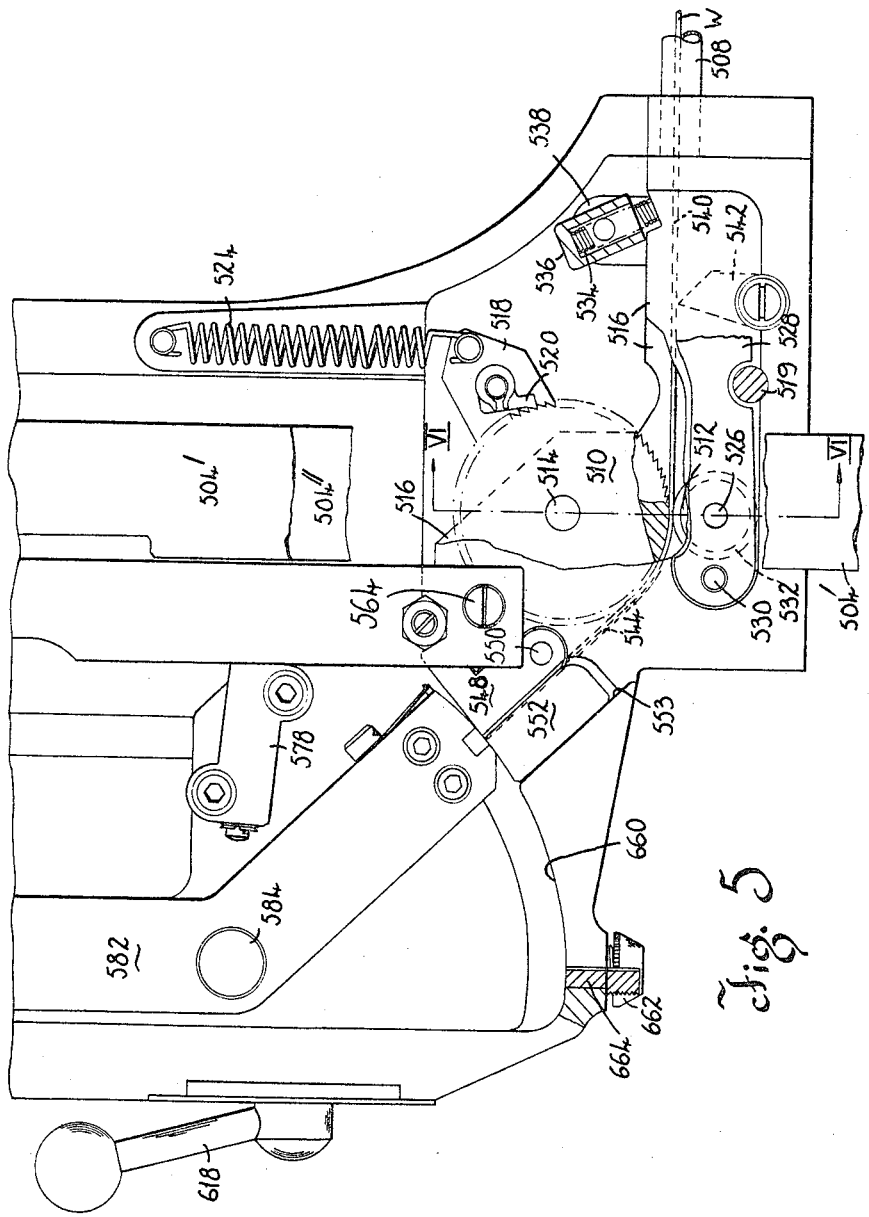

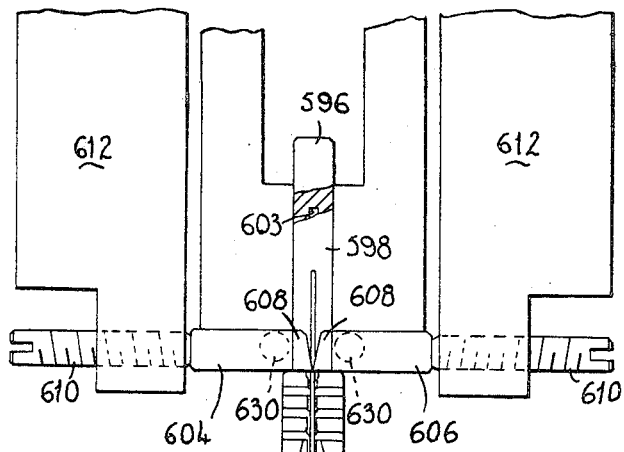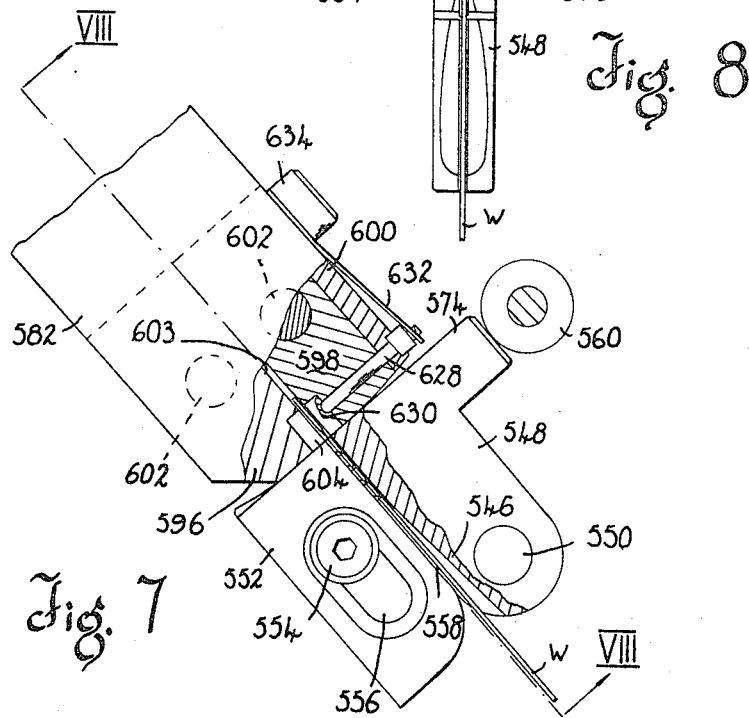

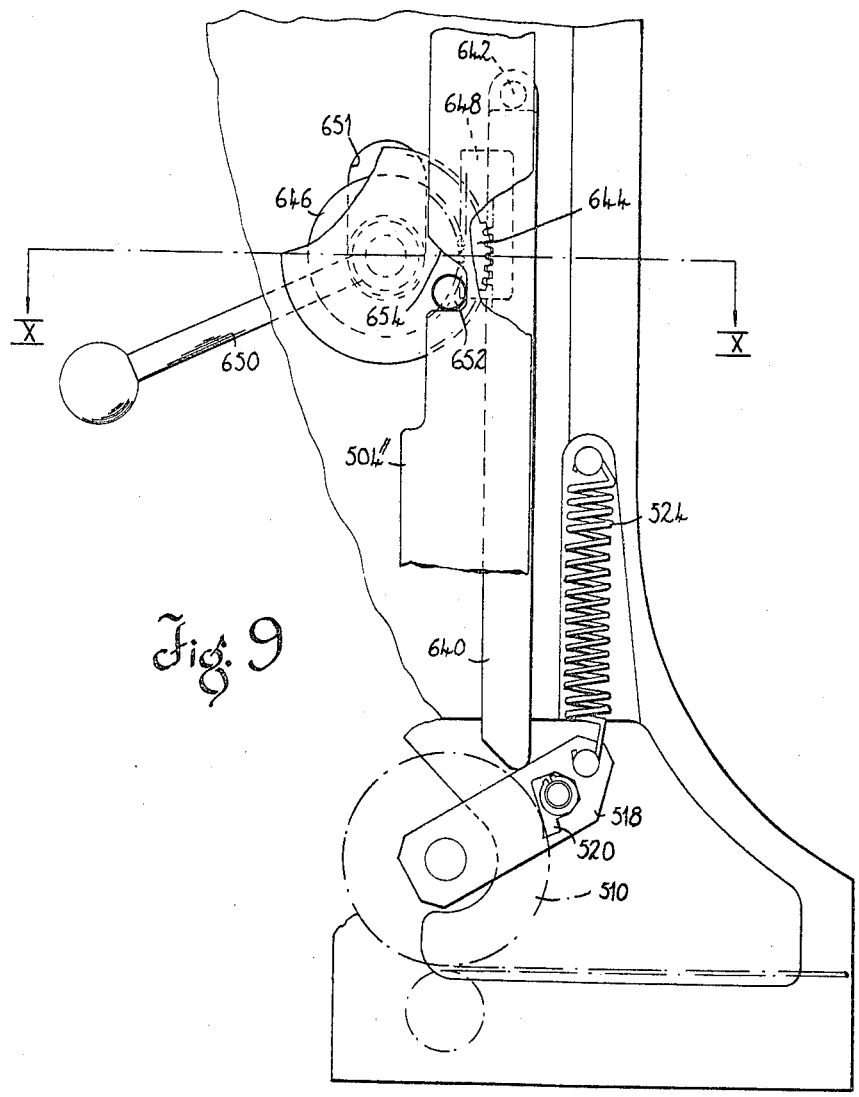

3,490,676
MACHINE FOR FORMING AND INSERTING FASTENERS
William Frank Willbond, Leicester, England, assignor to Whitfield, Hodgsons & Brough Limited, Kettering, England, a British company
Filed Jan. 20, 1967, Ser. No. 610,587
Int. Cl. B27f 7/02
U.S. Cl. 227—85                                     9 Claims

ABSTRACT OF THE DISCLOSURE

In a machine for making fasteners and inserting them into workpieces comprising wire feeding means, a shearing assembly to which wire is fed by the wire feeding means and by which lengths of wire are cut successively from the leading end portion of the wire to form fastener lengths, a work support for supporting a workpiece to be operated upon, driving means located above the work support for driving fasteners formed as aforesaid into a workpiece supported by the work support, and actuating means operable to cause the shearing assembly to cut a fastener from the leading end portion of wire fed thereto and to transfer the fastener thus formed to the driving means, there is provided (i) heading means whereby a head is formed on each fastener length prior to its being transferred to the driving means, and (ii) swaging means which operates on the wire whereby a fastener length can be provided with a point lying on the longitudinal axis of the wire prior to its being transferred to the driving means as aforesaid.

---

This invention is concerned with improvements in machines for making fasteners and inserting them into workpieces, for example workpieces of leather, wood, plastics, and like materials. The word "fastener" where used herein is used to denote an element intended to be inserted into a workpiece whether for the purpose of joining parts of the workpiece together or otherwise.

Machines which both make and insert fasteners are known. Machines of this type customarily comprise wire feeding means for feeding wire to a shear assembly at which lengths of the wire are cut to form fastener lengths, cutting of the wire usually being effected obliquely of the axis of the wire whereby to form a point on the fastener, and driving means, including a driver, to which fasteners cut by the shearing assembly are successively transferred by the shearing assembly.

While attention is thus paid to the formation of a point, often little or no attention is paid to the formation of a head at the opposite end of a fastener. It is however desirable in many cases that a head be formed, for example in order to ensure that one part being joined to another by a fastener is firmly locked and cannot be removed merely by lifting said one part relative to the other, the head in this case serving to prevent the aperture formed in said one part by passage of the fastener shank therethrough from readily being passed over the head end of the fastener.

In some machines of the type referred to above, the opposite end of the fastener length also having an obliquely cut face, the head of the driver by means of which such fasteners are driven into workpieces is sometimes so formed that said opposite end is bent over on itself as the fastener is so driven. In this way an irregular head may be formed. Since, however, this head forming operation depends upon sufficient resistance to penetration being afforded by the workpiece for the bending of the end to take place prior to complete insertion of the fastener the size of the head cannot be reliably controlled and varies considerably even in consecutively formed fasteners.

Furthermore in such machines the cutting of the wire obliquely of its axis to provide inserting points on the fasteners thus formed causes the inserting points to be offset relative to the axis of the wire with a result that the fasteners when driven into a workpiece tend not to follow a rectilinear path but rather to buckle or follow a more or less arcuate path in the workpiece which may give rise to the workpiece being secured unreliably.

It has previously been proposed either to bend the obliquely cut point itself of the fastener length on to the wire axis by clamping the wire and applying pressure to said point or to bend the shank portion of the fastener length in such a manner that the point lies on the wire axis, a "bump" being, however, formed thereby in the shank portion. In either case, however, the degree to which the point can satisfactorily be displaced on to the wire axis depends largely upon the resilience and strength of the wire and thus the disposition of the point will vary according to the wire being used.

The present invention has for its object to provide an improved machine for making fasteners and inserting them into workpieces, for example workpieces of leather, wood, plastics, and like materials, in which the disadvantages referred to above are overcome.

There is hereinafter described in detail, to illustrate the invention by way of example, one machine in accordance with the invention, this machine, which is a machine for making fasteners and inserting them into workpieces, e.g. into shoe heels for securing toppieces thereto, comprising wire feeding means for feeding wire to a shearing assembly by which lengths of wire are cut successively from the leading end portion of the wire to form fastener lengths, and driving means for driving fasteners thus formed into a workpiece supported beneath the driving means by a work support, wherein fasteners cut by the shearing assembly are transferred successively thereby to the driving means.

The machine also comprises heading means, including a heading tool, whereby each fastener length is formed with a head prior to being transferred to the driving means, the tool being caused to operate on the leading end of the wire prior to the operation of the shearing assembly to cut a fastener length from the wire. In a cycle of operation of the machine, a fastener length on which a head has been formed in a previous cycle of operation is cut by the shearing means and transferred thereby to the driving means by which it is driven into a workpiece, the heading tool being thereafter caused to operate on the leading end of the wire left after the shearing operation to form a head thereon.

The machine further comprises a swaging assembly whereby each fastener length is formed with a point lying on the longitudinal axis of the wire prior to being transferred to the driving means, the swaging assembly being caused to operate on a leading end portion of the wire prior to operation of the shearing assembly, the wire thus being first necked by the swaging means and a fastener length being thereafter cut from the wire in the region of the necked portion thereof. In a cycle of operation of the machine, the wire is advanced by the wire feeding means to feed the leading end portion thereof between two swaging dies which are then caused to operate thereon as aforesaid, the shearing assembly being thereafter operable to cause a fastener to be cut therefrom.

The swaging dies, which are accommodated in the shearing assembly for sliding movement therein, are shaped so as to form a chisel point on the fasteners. Should it be, however, that a fastener with a square cut end is required, control means is provided whereby the swaging dies can be rendered ineffective in the operation of the machine.

In a cycle of operation of the machine the wire, the leading end of which has been headed in a previous cycle, is first advanced to feed the leading end portion between the swaging dies, the swaging dies are then caused to operate on said leading end portion as aforesaid, a fastener is cut from said leading end portion by the shearing assembly and is transferred thereby to the driving means, the driving means operates to drive the fastener into a work-piece supported therebeneath, the wire is then gripped by wire gripping means, and the heading tool is caused to operate on the leading end of the wire to form a head thereon.

The shearing assembly of the machine is supported by a carrier mounted on a frame of the machine for movement between a first position, in which the assembly is adjacent the wire gripping means and can receive therein the leading end portion of the wire, and a second position, in which the assembly is adjacent the driving means, movement of the carrier from its first to its second position causing a fastener length to be cut from the leading end portion of the wire and to be transferred to the driving means. The heading tool is also supported by the carrier, the arrangement being such that when the carrier moves to its second position the heading tool is moved to a position adjacent the wire gripping means whereat it operates on the leading end of the wire left by the shearing operation to form a head thereon.

It will be apparent that in using the machine fasteners are made which are formed reliably with heads and that, when a point is desired, the points are also reliably formed centrally at the inserting end of the fasteners.

There now follows a detailed description, to be read with reference to the accompanying drawings, of the machine in accordance with the invention. It will of course be realised that this machine has been selected for description by way of exemplification of the invention and not by way of limitation thereof.

In the accompanying drawings:

FIGURE 1 is a view of the machine in right hand side elevation;

FIGURE 2 is a view in front elevation and partly in section of a fastener forming and inserting head of the machine;

FIGURE 5 is a view, on an even larger scale, of part of the head shown in FIGURE 3 showing wire-feeding means;

FIGURE 7 is a fragmentary view, partly in section, of wire shearing means of the aforementioned head;

FIGURE 8 is a view in section on the line VIII—VIII of FIGURE 7;

FIGURE 9 is a view in right hand side elevation, with parts broken away and partly in section, of means for adjusting the length of feed of wire.

The machine in accordance with the invention, which is a machine for making fasteners and inserting them into workpieces, e.g. into shoe heels for securing toppieces thereto, comprises a table 22 supported by a lower housing 20 arranged to stand on the floor, and supporting a fastener forming and inserting head 500 (FIGURE 1) which overhangs a front part of the table 22 where a work support constituted by a horn 28 is located, the housing 20, table 22 and head 500 constituting a main frame of the machine.

Figure 3:
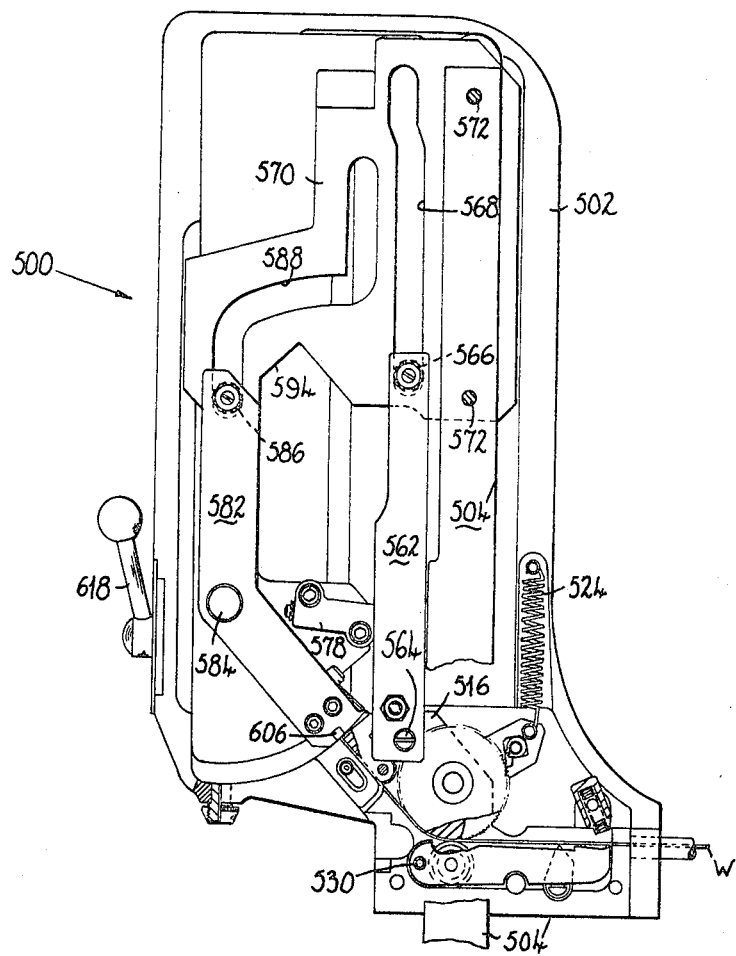
FIGURE 3 is a view in right hand side elevation, with a cover plate thereof removed, of the aforementioned head shown in FIGURE 2.
Figure 6:
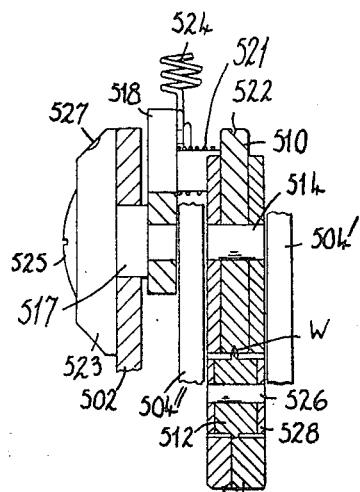
FIGURE 6 is a view in section on the line VI—VI of FIGURE 5.

The fastener forming and inserting head 500 comprises a housing 502 in which is accommodated a vertically reciprocating cam bar 504 (FIGURES 3 and 6), consisting of two parallel members 504' and 504", coupled at its lower end to a pin (not shown) carried by a drive rod 36 which is movable heightwise in the housing 20 in response to revolution of a crank shaft (not shown). The housing 502 also supports a reel 503 (FIGURE 1) of wire W which is guided through a tube 508 and between upper and lower feed wheels 510, 512 (FIGURES 5 and 6). The upper feed wheel 510 is mounted for free rotation on a pin 514 secured in a bracket 516 supported by the housing 502. Pivoted on a bush 517 coaxial with the pin 514 is an arm 518 which carries a pivoted pawl 520 urged by a torsion spring 521 into engagement with ratchet teeth formed on the periphery of the wheel 510. A groove 522 extends round the periphery of the wheel to receive the wire W being fed, the ratchet teeth alongside the groove assisting the grip on the wire. The arm 518 is normally held in a raised position (as shown in FIGURES 3 and 5) by a tension spring 524 anchored to the housing, the wire thus being fed upon depression of the arm. To feed the wire past the feed wheel by hand, however, in the initial setting up of the machine, the arm 518 can be repeatedly depressed by turning back and forth the bush 517 which is accessible on the outside of the housing, and is provided with an annular retaining piece 523 secured to the bush by a bolt 525. The piece 523 has a hole 527 in it to receive a rod by which it, and thus the bush, can be turned.

The lower feed wheel 512 is freely rotatable on a cross pin 526 bridging two L-shaped levers 528 one at either side of the bracket 516 and pivoted at 530, the bracket being cut away to allow limited swinging movement of the wheel 512 about the pivot 530. The wheel 512 has a rib 532 extending round its periphery and capable of pressing the wire W into the groove 522 when the wheel 512 is urged towards the wheel 510 by a compression spring 534 accommodated in a thimble 536 pivotally mounted between upstanding legs 538 of the levers 528 and bearing on a V-shaped recess in an upper surface of the bracket 516, which is made in two parts held together by a bolt 519, the parts being recessed to accommodate the feed wheels and one of said parts providing a passage 540 for the wire W. A spring-pressed stop pawl 542 accommodated in a recess formed in the bracket 516 bears against the wire W in the passage 540 to restrain its retraction.

At the forward end of said one part of the bracket 516 a channel 544 is provided for the wire between the upper feed wheel 510 and a groove 546 in an upper wire gripping jaw 548 (FIGURE 7). The upper jaw 548 is pivoted on a pin 550 carried by the bracket 516. A lower wire gripping jaw 552 is rigidly secured to the bracket 516 by a bolt 554 accommodated in a slot 556 in the jaw to permit lengthwise adjustment thereof along an inclined abutment face 553 (FIGURE 5) of the housing 502. This lower jaw 552, which is also arranged to co-operate with a shearing assembly of the machine to cut fasteners from the wire, as will be hereinafter described, has a flat inclined surface 558 (FIGURE 7) against which the wire W rests.

Figure 4:
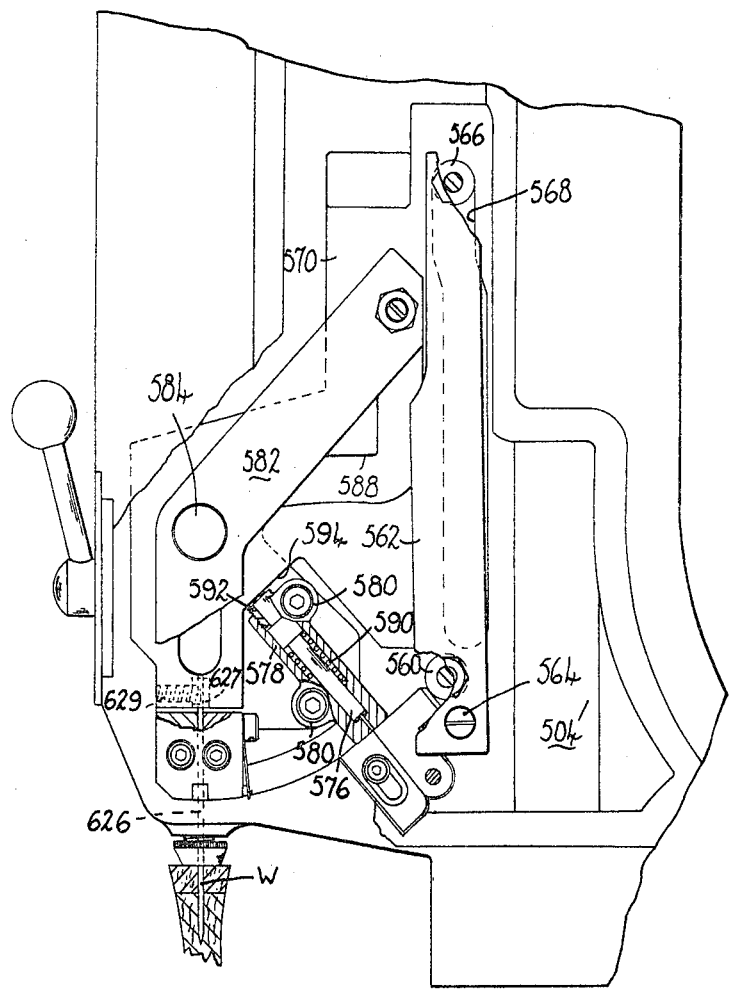
FIGURE 4 is a view, on a larger scale, of part of the head shown in FIGURE 3, showing a carrier of the head in a fastener driving position.

The wire gripping jaws 548, 552 are operated by a roller 560 (FIGURE 4) mounted on a lever 562 pivoted to the bracket 516 at 564; the lever 562 consists of two parallel members one on either side of the bracket. Near its upper end the lever 562 carries a cam roll 566 accommodated in a cam slot 568 in a cam plate 570 fixed to the cam bar 504 by bolts 572. The shape of the cam slot 568 is such that towards the end of each downward stroke of the cam bar 504 the roller 560 is forced against an abutment 574 (FIGURE 7) provided by the upper jaw 548 thus urging the jaw to pivot about the pin 550 and squeeze the wire against the surface 558 of the lower jaw 552.

The machine also comprises a heading tool 576 accommodated in a sleeve 578 (FIGURE 4) having two ears 580 by which it is secured to a carrier 582 constituted by two parallel members and pivoted at 584 on the housing 502 to swing between, a first, rest, position (shown in FIGURES 3 and 5) and a second, fastener-driving, position (FIGURE 4), by the action of a cam roll 586 (FIGURE 3) carried on the carrier and engaging in a cam slot 588 in the cam plate 570. When the carrier moves into its second position, the heading tool 576 is brought into alignment with the wire W gripped by the jaws 548, 552. The heading tool is normally urged by a spring 590 (FIGURE 4) into a retracted position in which a collar of the tool abuts a retaining sleeve 592 threaded into the sleeve 578, but at the end of the downward stroke of the cam bar 504, a face 594 of the cam plate 570 strikes the tool 576 and causes a tip of the tool to project from the sleeve 578 and into a widened upper end portion of the groove 546 in the upper jaw, there to engage the leading end of the wire and form a head thereon.

The carrier 582 also supports a shearing assembly comprising two blocks 596, 598 (FIGURES 7 and 8) a rearward one 598 of which is backed up by a lip 600 of the carrier, and which are secured on the carrier by bolts 602. A channel 603 in the block 596 provides a passage which, when the carrier is in its first position, is in alignment with the groove 546 in the upper jaw 548. Complementary grooves in abutting lower edge portions of the blocks 596, 598 slidably accommodate two opposed swaging dies 604, 606 shaped with wedge-shaped portions 608 which operate to swage a chisel-shaped neck on wire W interposed therebetween, operation of the dies being effected by screws 610 (FIGURE 8) adjustably threaded into lower ends of two depending arms 612 eccentrically pivoted on spindles 614 (FIGURE 2) mounted on the housing 502 one at either side of the carrier 582 and carrying intermeshing toothed quadrants 616 which can be turned by a hand lever 618 secured to one of the spindles. Upper portions of the arms 612 are urged towards one another by springs 613 and carry pawls 620 urged downwardly by torsion springs 622 into positions (as shown in FIGURE 2) in which they project into the path of a shoulder piece 624 on the cam plate 570. Near the beginning of the downward stroke of the cam bar 504 the shoulder piece 624 strikes the pawls thus pivoting the arms 612 on the spindles 614 and causing the screws 610 to force the swaging dies 604, 606 towards one another; pressure on the elements is relieved as soon as the shoulder piece 624 has passed the pawls. Should it, however, be desired that the fasteners be provided with square cut ends, the operator merely moves the hand lever 618 from its position shown in FIGURE 2 through 90° to the right until a spring pressed plunger 619 engages a shallow depression in one of the quadrants. The eccentric portions of the spindles are so arranged that when so rotated the screws 610 do not engage the swaging dies when the arms 612 swing under the influence of the shoulder piece 624.

When the swaging dies 604, 606 are urged towards one another in a cycle of operation of the machine shoulders at either side of the wedge-shaped portions come into abutting engagement with shoulders of the blocks 596, 598 and are subsequently separated by a formed fastener driven therebetween by a driver 626 (FIGURE 4) as hereinafter described, the thus separated dies being retained in their separated positions by plungers 628 (FIGURE 7) slidably mounted in the carrier and urged towards shallow recesses 630 in the elements by a leaf spring 632 secured to the carrier by a bolt 634.

The block 598 of the shearing assembly constitutes a shearing element between which an upper edge of the fixed lower jaw 552 and the wire is sheared when the carrier moves from its first to its second position, the fastener thus severed being carried by the shearing assembly to the second position in which it lies in the path of the driver 626. The driver is mounted in a sleeve 627 (FIGURE 4) secured to the cam plate 570 by a set screw 629.

Figure 10:
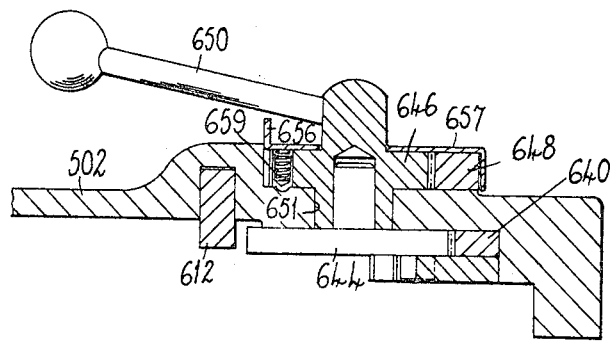
FIGURE 10 is a view in section on the line X—X of FIGURE 9.

The wire is fed through the jaws 548, 552 into the channel 603 in the block 596 at the beginning of each operating cycle of the machine when the arm 518 is depressed by a vertically disposed bar 640 (FIGURES 9 and 10) slidable in a guideway provided by the housing 502. The raised position of the arm is determined by a stop pin 642 engaged by the bar 640 when the bar and arm are lifted under the action of the spring 524. The bar 640 is provided with rack teeth engaged by a pinion 644 freely rotatable in a bore formed in a hub portion of a second pinion 646 which meshes with a rack 648 fixed to the housing 502 and has a hand lever 650 secured to its hub portion, the hub portion passing through a vertical slot 651 in the housing so that the hand lever is accessible on the outside. Turning the hand lever causes the pinion 646 to ride up or down the fixed rack thus lifting or lowering the pinion 644 which rides a corresponding amount up or down the bar 640. Projecting from one side of the pinion 644 is a pin 652 which, when the machine is at rest, is accommodated in a cam slot 654 formed in a front edge of one of the members forming the cam bar 504. Thus, when the cam bar 504 is lowered it causes the pin 652 to be pushed out of the slot until it rests against a vertical front face of the bar 504, thereby rotating the pinion and causing the bar 640 to be pushed down to depress the arm 518. Raising and lowering the pinion 644 varies the position of the pin 652 in the slot 654 and thus the amount of rotation imparted to the pinion 646 by the cam bar 504 when the cam bar descends, so that the stroke of the bar 640 and the amount of rotation imparted to the feed wheel 510 are also varied to vary the length of fastener formed. A scale 656 in ⅛ of an inch on a plate 657 secured on the outside of the housing (FIGURES 2 and 10) enables the operator readily to adjust the hand lever 650 to the appropriate setting for a desired length of wire feed. A spring-pressed plunger 659 housed in a bore in the pinion 646 is able to engage one of a series of shallow depressions in the housing 502 to hold the pinion in a selected position.

Conveniently, in using the machine the operator presents a workpiece to the machine and raises the horn 28 to an operative position against a flat-bottomed nut 662 threaded into a boss 664 depending from the housing 502. At this time the wire W lies between the jaws 548, 552 (which are not gripping it) with a head already formed at its leading end. The operator initiates a cycle of operation of the machine by depressing a pedal 80 whereupon the cam bar 504 begins to descend; as it does so, first the pin 652 rides out of the slot 654 causing the wire W to be fed whereafter the shoulder piece 624 forces the pawls 620 apart causing the wire to be swaged (unless the hand lever 618 has been turned to render the swaging dies 604, 606 ineffective). The pressure on the swaging dies is relieved as the shoulder piece passes the pawls. The carrier 582 now swings (under the control of the cam slot 588) to its second position, a fastener being sheared from the wire stock at the neck formed by the swaging dies as it does so, an arcuate interior wall 660 (FIGURE 5) of the housing preventing the shearing dies and fastener from falling out of the shearing assembly during such movement. The heading tool 576 is simultaneously brought into alignment with the jaws 548, 552. Continued downward movement of the cam plate 570 now causes the upper jaw 548 to be pressed towards the lower one 552 (under the control of the cam slot 568) to grip the wire W and also causes the driver 626 to drive the fastener into te workpiece, the swaging dies being separated by the passage of the driver therebetween. At the conclusion of its downward movement, the face 594 of the cam plate 570 strikes the heading tool which forms a head on the leading end of the wire left by the shearing operation.

The cam bar is then returned to its initial position.

Having described the invention, what I claim as new and desire to secure by Letters Patent of the United States is:

1. A machine for making fasteners and inserting them into workpieces comprising wire feeding means, a shearing assembly to which wire is fed by the wire feeding means and by which lengths of wire are cut successively from the leading end portion of the wire to form fastener lengths, a work support for supporting a workpiece to be operated upon, driving means located above the work support for driving fasteners formed as aforesaid into a workpiece supported by the work support, and actuating means operable to cause the shearing assembly to cut a fastener from the leading end portion of wire fed thereto and to transfer the fastener thus formed to the driving means, characterized by a tool for heading the leading end of the wire remaining after a fastener is cut therefrom and while the cut fastener is being driven by the driving means.

2. A machine according to claim 1 characterized in that, in a cycle of operation of the machine, a fastener length, on which a head has been formed as aforesaid in a previous machine operating cycle, is cut by the shearing assembly and transferred thereby to the driving means, the heading tool being thereafter caused to operate on the leading end of the wire left after the shearing operation.

3. A machine according to claim 1 characterized by a frame, and a carrier on which the shearing assembly is supported and which is mounted on the frame for movement between a first position, in which the leading end portion of wire headed during the previous machine operating cycle can be fed to the shearing assembly, and a second position, in which the shearing assembly is adjacent the driving means, movement of the carrier from its first to its second position causing a fastener to be cut from the leading end portion of the wire and to be transferred by the shearing assembly to the driving means.

4. A machine according to claim 3 characterized in that the heading tool is also supported by the carrier, the arrangement being such that when the carrier is moved to its second position the heading tool is moved thereby to a position at which it can operate on the leading end of the wire left by the shearing operation to form a head thereon.

5. A machine according to claim 4 characterized by wire gripping means also mounted on the frame and operable to grip the leading end portion of the wire prior to operation of the heading tool on the leading end thereof as aforesaid.

6. A machine according to claim 5 characterized by cam means effective, in a cycle of operation of the machine, to cause, in sequence, the wire, the leading end of which has been headed in a previous machine operating cycle, to be advanced to feed the leading end portion thereof to the shearing assembly supported by the carrier in said first position, the carrier to be moved to carry the shearing assembly to said second position whereby a fastener length is cut and transferred to the driving means by which it is driven into a workpiece, the wire gripping means to grip the leading end portion of the wire left by the shearing operation, and the heading tool to operate to form a head on the leading end of the wire.

7. A machine according to claim 1 characterized by swaging means including dies mounted in the shearing assembly and operable to neck the wire before it is cut and transferred whereby a fastener is formed having a point lying on the longitudinal axis of the wire.

8. A machine according to claim 7 characterized by control means whereby the swaging dies can be rendered ineffective.

9. A machine according to claim 7 characterized by wire gripping means operable to grip the leading end portion of the wire remaining after a fastener is cut therefrom and cam means effective, in a cycle of operation of the machine, to cause, in sequence, the wire, the leading end of which has been headed in a previous machine operating cycle, to be advanced to feed the leading end portion thereof to the shearing assembly supported by the carrier in said first position, the swaging means to operate on the leading end portion of the wire to form a necked portion thereon, the carrier to be moved to carry the shearing assembly to said second position whereby a fastener length is cut in the region of the necked portion of the wire and transferred to the driving means by which it is driven into a workpiece, the fastener thus formed being provided with a point at its inserting end, the wire gripping means to grip the leading end portion of the wire left by the shearing operation, and the heading tool to operate to form a head on the leading end of the wire.

References Cited

UNITED STATES PATENTS

| 358,710 | 3/1887 | Weeks et al. | 227—84 |
| 566,359 | 8/1896 | Weeks et al. | 227—92 |
| 654,762 | 7/1900 | Raymond | 227—92 X |

TRAVIS S. McGEHEE, Primary Examiner

U.S. Cl. X.R.

227—84, 92